M. L. AKERS.
ADJUSTABLE PLATFORM FOR HARVESTING MACHINES.
APPLICATION FILED DEC. 1, 1913. RENEWED MAY 8, 1915.
1,144,679.
Patented June 29, 1915.
2 SHEETS—SHEET 1.
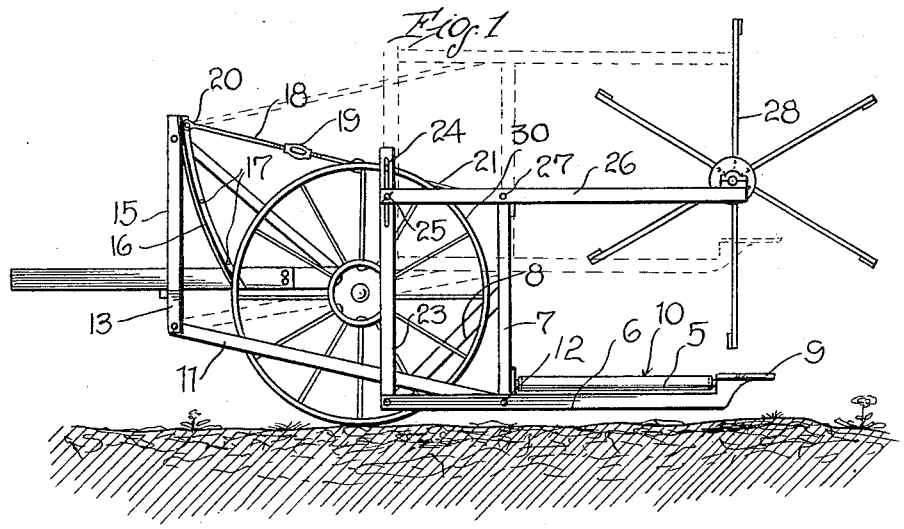
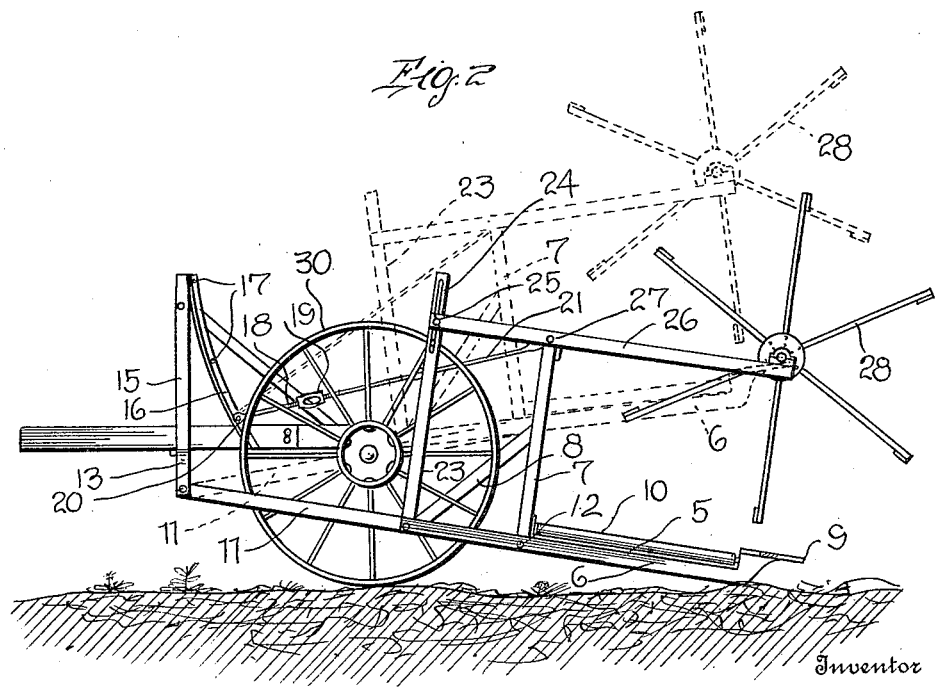

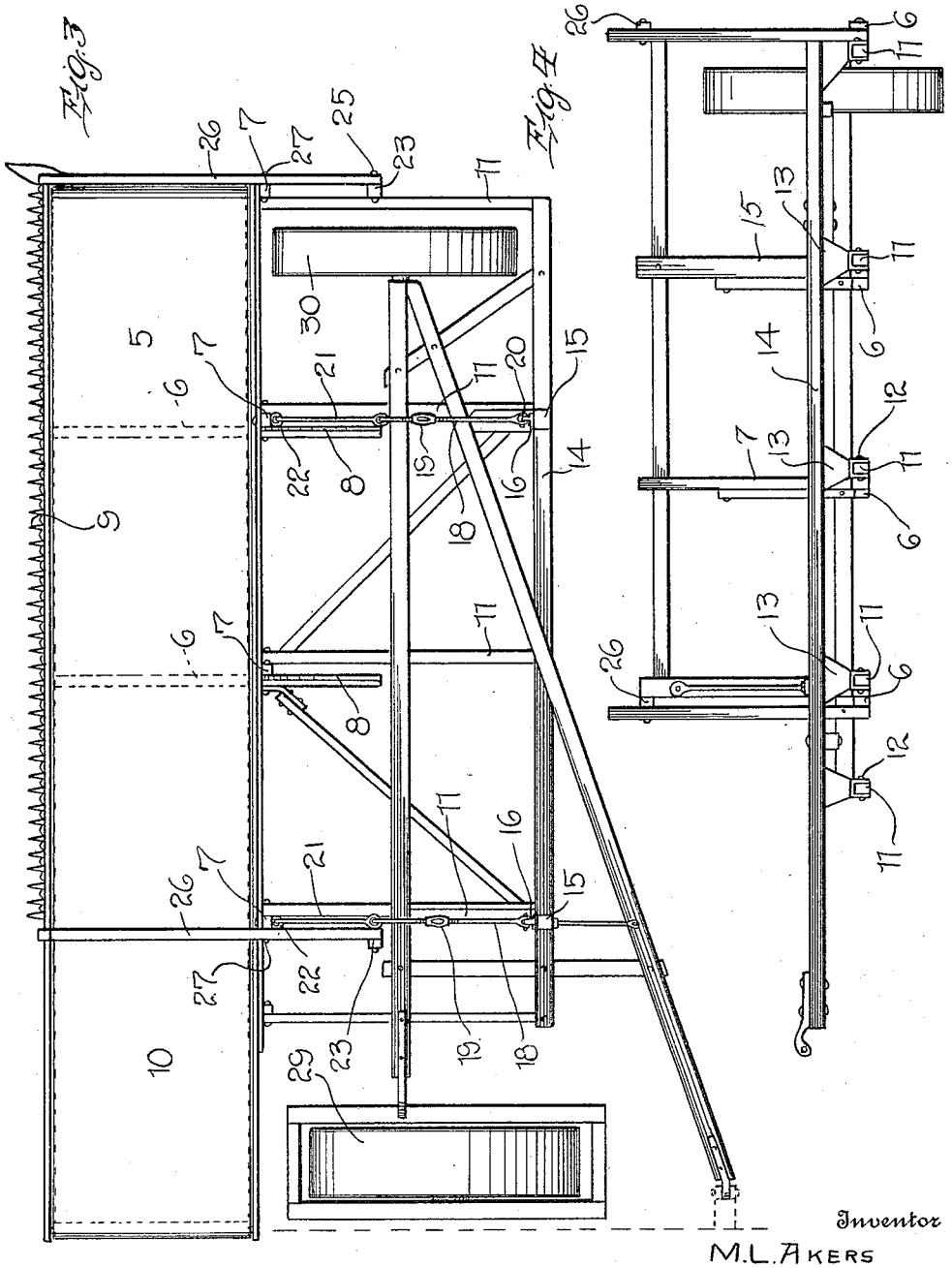

UNITED STATES PATENT OFFICE.

MAURICE L. AKERS, OF PENDLETON, OREGON.

ADJUSTABLE PLATFORM FOR HARVESTING-MACHINES.

1,144,679.

Specification of Letters Patent. Patented June 29, 1915.

Application filed December 1, 1913, Serial No. 804,076. Renewed May 8, 1915. Serial No. 26,902.

*To all whom it may concern:*

Be it known that I, MAURICE L. AKERS, citizen of the United States, residing at Pendleton, in the county of Umatilla and State of Oregon, have invented certain new and useful Improvements in Adjustable Platforms for Harvesting-Machines, of which the following is a specification, reference being had to the accompanying drawings.

This invention relates to certain improvements in grain headers or harvesters and has for its principal object to provide improved means whereby the platform of the header which receives the grain may be raised or lowered without disposing the same at an inclination, so that said platform will at all times maintain a parallel position with relation to the ground.

The invention further involves improved means for tilting the platform to facilitate the reaping of fallen or leaning grain.

My invention has for a further object to provide means which is applicable to the common grain header whereby the above purposes are efficiently carried out, or may be employed in conjunction with a combined harvester and thresher.

The invention has for still another object to produce an apparatus of the above type which is simple in its construction, may be inexpensively manufactured and is highly satisfactory and reliable in actual use.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation illustrating the preferred embodiment of my invention, parts unnecessary to a clear understanding of the same being eliminated. Fig. 2 is a similar view showing the platform in full lines in its lower tilted or inclined position and in dotted lines in its upper position; Fig. 3 is a plan view; Fig. 4 is a rear end view.

Referring in detail to the drawings, 5 designates a platform which is preferably constructed of a suitable base mounted upon a series of beams 6. These beams extend for a slight distance beyond the rear edge of the platform base and to the same, the uprights 7 are securely bolted. These uprights are braced by means of diagonal bars 8 which are bolted or otherwise secured to said uprights and to the rear ends of the beams 6.

9 designates the usual sickle arranged at the forward longitudinal edge of the platform 5. Over the platform a movable endless conveyer or apron 10 is arranged to receive and convey the grain to a suitable elevator arranged at one side of the header as is usual in machines of this character.

A series of beams 11 are pivotally mounted at their forward ends upon the beams 6, as shown at 12, the rear ends of said beams being pivoted in suitable hanger brackets 13, which are secured upon a transverse beam 14 of the header frame. Upon this beam the spaced vertical posts or uprights 15 are mounted, to the upper ends of which the angle bar braces 16 are fixed, the lower ends of these braces being suitably secured to the header frame. One of the flanges of these angle bars projects forwardly and is provided with a series of openings 17.

18 designates rod sections connected by a turn buckle 19. One of these rod sections is bifurcated at one end to receive the flange of one of the angle bars 16 and a bolt 20 is adapted for insertion through coinciding openings in said rod section and the flange of the angle bar.

A rod 21 is loosely connected to the other of the rod sections 18 and is in turn connected by means of the eye-bolt 22 to one of the uprights 7. The rods 18 and 21 while permitting of a vertical movement of the platform 5, so that the same may be adjusted to either of the inclined positions illustrated in Fig. 2, constitutes a substantially rigid brace between the uprights 7 and the angle bars 16. When the platform 5 is disposed in a horizontal position, the bars 11 and the rods 18 and 21 extend in parallel relation, the length of the rods and bars being approximately equal so as to admit of the vertical adjustment of the platform while maintaining the horizontal position thereof.

Upon the rear ends of the longitudinal beams 6, arranged at opposite ends of the platform 5, the uprights 23 are rigidly mounted. The upper ends of these uprights are slotted as at 24 to receive bolts or pins 25 arranged in the rear ends of the bars 26. These bars 26 are fulcrumed as at 27 upon the upper ends of the uprights 7, and in the forward ends of said bars, the reel 28 is mounted. It is obvious that by simply adjusting the rear ends of the bars 26 upon the upper ends of the uprights 23, the reel 28 may be raised or lowered in accordance with the height of the standing grain.

From the above description, it is believed that the construction and manner of operation of the invention will be clearly and fully understood. When the header is being used in standing grain the platform 5 will be at all times disposed in the position shown in Fig. 1 wherein the same is located closely adjacent to the ground surface and in parallel relation thereto. As the grain is cut, it falls upon the platform or the apron which moves thereover, and owing to the fact that the platform is disposed at all times in a horizontal plane, liability of the grain moving forwardly over the front edge of the platform and dropping to the ground, is obviated. Thus loss of the grain is effectually prevented. When it is desired to cut fallen or leaning grain, the rear ends of the rods 18 are moved downwardly upon the brace bars 16 and connected to the lower ends thereof by means of the bolts 20 as clearly shown in Fig. 2. When the parts are arranged in this manner, a substantially rigid frame structure is obtained, so that the platform 5 cannot move from its adjusted position.

In the accompanying drawings, I have illustrated the bull wheel 29 and grain wheel 30 which support the harvester. The header frame is attached to the thresher or separator in the usual manner. Any desired means may be employed for elevating the header platform, such as the usual rack and pinion, and it will also be understood that any ordinary means of counterbalancing the header frame is employed. It will be seen from the foregoing that I have produced a machine of comparatively simple construction and one which is highly efficient in operation and desirable for the purposes in view. The several parts are all of simple construction and may be produced at comparatively small manufacturing cost.

It will be understood that while I have above described the preferred construction and arrangement of the several elements, my invention is susceptible of considerable modification therein and I therefore reserve the right to resort to all such legitimate changes as may be fairly embodied within the spirit and scope of the appended claims.

Having thus described the invention, what is claimed is:

1. In a machine of the character described, a main wheel supported frame, a platform provided with rearwardly extending beams, bars pivotally mounted at their forward ends upon said beams, brackets depending from the main frame in which the rear ends of said bars are pivotally mounted, uprights mounted upon the rear ends of said beams, and bracing means between said uprights and the main frame.

2. In a machine of the character described, a wheel supported header frame, a grain receiving platform arranged in advance of said frame, including rearwardly extending beams, uprights mounted upon said beams, bars pivotally connected to the beams at their forward ends, means for pivotally suspending said bars at their rear ends from the header frame whereby said platform may be raised or lowered, and bracing means between said uprights and the header frame to maintain said platform in parallel relation to the ground in any of its adjusted positions.

3. In a machine of the character described, a wheel supported header frame, a platform arranged in advance of said frame to receive the grain, bars pivotally connected to said platform and extending rearwardly therefrom, hangers depending from the header frame in which the rear ends of said bars are pivotally mounted, upwardly extending curved angle bars mounted upon the header frame, uprights secured to the rear of the platform, adjustable braces connected to the upper ends of said uprights, and means for connecting said braces to the curved angle bars.

4. In a machine of the character described, a wheel supported header frame, a platform arranged in advance of said frame to receive the grain, longitudinally disposed bars pivotally mounted upon the header frame and pivotally connected to said platform, uprights mounted upon the rear of the platform, uprights secured to the header frame, curved brace bars secured to the upper ends of said latter uprights, and to the header frame, said brace bars having forwardly extending flanges provided with a series of openings, and additional supporting members for the platform loosely connected to the upper ends of the uprights and provided with means insertible through the openings in said brace bars.

In testimony whereof I hereunto affix my signature in the presence of two witnesses.

MAURICE L. AKERS.

Witnesses:
FRANCES WEBER,
WILL M. PETERSON.